(12) United States Patent
Kalinin et al.

(10) Patent No.: US 10,210,348 B2
(45) Date of Patent: Feb. 19, 2019

(54) SYSTEM AND METHOD OF BLOCKING ACCESS TO PROTECTED APPLICATIONS

(71) Applicant: AO Kaspersky Lab, Moscow (RU)

(72) Inventors: Alexander V. Kalinin, Moscow (RU); Pavel L. Polozov, Moscow (RU); Vyacheslav I. Levchenko, Moscow (RU); Maxim V. Yudin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 217 days.

(21) Appl. No.: 15/368,898

(22) Filed: Dec. 5, 2016

(65) Prior Publication Data
US 2018/0032745 A1 Feb. 1, 2018

(30) Foreign Application Priority Data
Jul. 29, 2016 (RU) ................................ 2016131361

(51) Int. Cl.
G06F 21/62 (2013.01)
G06F 3/0481 (2013.01)
G06F 21/56 (2013.01)

(52) U.S. Cl.
CPC .......... *G06F 21/629* (2013.01); *G06F 3/0481* (2013.01); *G06F 21/566* (2013.01); *G06F 2221/033* (2013.01)

(58) Field of Classification Search
CPC .................................................... G06F 21/629
See application file for complete search history.

(56) References Cited

U.S. PATENT DOCUMENTS

| | | | |
|---|---|---|---|
| 7,818,800 B1 * | 10/2010 | Lemley, III ............. | G06F 21/50 726/22 |
| 8,225,404 B2 | 7/2012 | Freericks et al. | |
| 8,904,538 B1 * | 12/2014 | Glick ...................... | G06F 21/56 726/24 |
| 9,177,146 B1 * | 11/2015 | Lee ......................... | G06F 21/566 |
| 2009/0165136 A1 * | 6/2009 | Obrecht ................. | G06F 21/566 726/24 |
| 2012/0124389 A1 | 5/2012 | Villani et al. | |
| 2012/0255000 A1 | 10/2012 | Sallam | |
| 2013/0346492 A1 | 12/2013 | Wang et al. | |
| 2015/0319183 A1 | 11/2015 | Liske | |
| 2016/0154960 A1 * | 6/2016 | Sharma ................... | G06F 21/56 726/25 |

FOREIGN PATENT DOCUMENTS

EP 2808822 A1 3/2014
RU 258978 C2 10/2016

* cited by examiner

*Primary Examiner* — Kambiz Zand
*Assistant Examiner* — Thanh H Le
(74) *Attorney, Agent, or Firm* — Arent Fox LLP; Michael Fainberg (57) ABSTRACT

Disclosed are systems and methods for blocking access to protected applications. An exemplary method includes: intercepting access by a process of first information to be displayed on the user's device; determining second information based on the interception of the access by the process, the second information associated with the process; determining a region on a display of the user's device associated with the first information; analyzing one or more intersections between the region and at least one graphic interface associated with the process; and blocking the access by the process to the first information based on the analysis of the one or more intersections between the region and the at least one graphic interface associated with the process.

20 Claims, 3 Drawing Sheets

SYSTEM AND METHOD OF BLOCKING ACCESS TO PROTECTED APPLICATIONS

CROSS-REFERENCE TO RELATED APPLICATIONS

This application claims benefit of priority under 35 U.S.C. 119(a)-(d) to a Russian Patent Application No. 2016131361 filed Jul. 29, 2016, which is incorporated by reference herein.

FIELD OF TECHNOLOGY

The present disclosure relates generally to the field of computer security, and, specifically, to systems and methods of blocking access to protected applications.

BACKGROUND

At present, the number of various applications (software) used on computing devices, including personal electronic computing machines (computers), is constantly increasing. Among the multitude of applications, there are many malicious programs which are able to cause harm to a computer or the user of a computer (particularly the data of the user), such as Internet worms, keyboard trackers, computer viruses, as well as applications which can take screenshots for the purpose of stealing confidential information being displayed on the user's computing device.

The protection of the confidential data of a user of computing devices against such programs is an urgent problem. Such data may be displayed to the user using windows of various applications, such as browsers. Malicious applications can obtain access to the information being displayed on the screen of the computing device and take screenshots (snapshots of the screen) or obtain access to the bit representation of the image on the screen of the computing device (the data characterizing the image, by accessing the system functions of the operating system or the corresponding drivers forming the image, consisting of application windows and being displayed on the screen of the computing device).

Methods exist, often realized in antivirus applications, whereby the antivirus application intercepts the access of processes to the data characterizing the image on the screen of the computing device. If, among the windows of the applications running, there are those which belong to protected applications (e.g., applications running in the "sandbox"), access to the data characterizing the image on the screen of the computing device may be blocked.

The known methods do not solve the problem of blocking access to information being displayed to the user. The present disclosure may enable a more effective solution of the problem of blocking access to information.

SUMMARY

Disclosed are systems and methods for blocking access to protected applications. An exemplary method includes: intercepting access by a process of first information to be displayed on the user's computing device; determining second information based on the interception of the access by the process, the second information associated with the process; determining a region on a display of the user's device associated with the first information; analyzing one or more intersections between the region and at least one graphic interface associated with the process; and blocking the access by the process to the first information based on the analysis of the one or more intersections between the region and the at least one graphic interface associated with the process.

In one exemplary aspect, the determination of the region comprises at least one of: determining a location on the display corresponding to the region; determining a device context that corresponds to the region; determining a surface corresponding to the region; and determining a window identifier corresponding to the region.

In one exemplary aspect, the second information includes at least one of a process identifier and a thread identifier.

In one exemplary aspect, the analysis of the one or more intersections between the region and the at least one graphic interface associated with the process comprises: determining whether the at least one graphic interface associated with the process contains, is contained, or at least partially intersects the region on the display.

In one exemplary aspect, the analysis of the one or more intersections between the region and the at least one graphic interface associated with the process comprises: calculating an importance rating of the region based on the determination of whether the graphic interface associated with the process contains, is contained, or at least partially intersects the region on the display; and calculating a danger rating based on the information about the process.

In one exemplary aspect, the determination of whether to block the access by the process to the first information based on the analysis of the one or more intersections between the region and the at least one graphic interface associated with the process comprises: combining the importance rating and the danger rating; and comparing the combination of the importance rating and the danger rating to a predetermined threshold.

In one exemplary aspect, the calculation of the importance rating of the region based on the determination of whether the graphic interface associated with the process contains, is contained, or at least partially intersects the region on the display comprises: accessing, from an information database, one or more coefficients of confidentiality associated with one or more elements that at least partially intersect the region; and calculating the importance rating based on an algorithm that takes into account the one or more coefficients of confidentiality.

In one exemplary aspect, the method further comprises: calculating the one or more coefficients of confidentiality; and storing the calculated one or more coefficients of confidentiality in the information database.

In one exemplary aspect, the blocking of the access by the process to the first information comprises: substituting, in a memory of the user's device, a binary representation of the information being displayed to the user.

In one exemplary aspect, the method further comprises: determining whether an application associated with the process is malicious based on the analysis of the one or more intersections between the region and the at least one graphic interface associated with the process.

In one exemplary aspect, a system for controlling access of applications on a user's computing device, the system comprising: at least one processor configured to: intercept access by a process of first information to be displayed on the user's device; determine second information based on the interception of the access by the process, the second information associated with the process; determine a region on a display of the user's device associated with the first information; analyze one or more intersections between the region and at least one graphic interface associated with the process; and block the access by the process to the first information based on the analysis of the one or more intersections between the region and the at least one graphic interface associated with the process.

In one exemplary aspect, non-transitory computer-readable medium storing computer executable instructions for controlling access of applications on a user's computing device, comprising instructions for: intercepting access by a process of first information to be displayed on the user's device; determining second information based on the interception of the access by the process, the second information associated with the process; determining a region on a display of the user's device associated with the first information; analyzing one or more intersections between the region and at least one graphic interface associated with the process; and blocking the access by the process to the first information based on the analysis of the one or more intersections between the region and the at least one graphic interface associated with the process.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects on the invention are described herein in the context of a system, method and computer program product for blocking access to protected applications on a computing device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used in describing example aspect of the invention:

A malicious application may be an application able to cause harm to a computer or to the data of the user of the computer. Examples of malicious applications may include an Net worm, a keyboard tracker, and/or a computer virus. The harm caused by a malicious program may include unlawful access to the resources of the computer, including the data being stored on the computer (e.g., for the purpose of theft), as well as unlawful use of the resources, including for storage of data, performing computations, and so on.

A trusted application may be an application which does not cause harm to a computer or to its user. A trusted application may include an application which has been developed by a trusted software manufacturer, downloaded from a trusted source (such as a site listed in a database of trusted sites), and/or associated with an identifier (e.g., the MD5 of the application file) that may be stored in a database of trusted applications. The identifier of the manufacturer, such as a digital certificate (e.g., associated with a trusted application), may also be stored in the database of trusted applications.

A non-trusted application may be an application which is not trusted, but also not recognized as harmful, for example using an antivirus application.

A malicious file may be a file which is a component of a malicious application.

A non-trusted file may be a file which is a component of a non-trusted application.

A trusted file may be a file which is a component of a trusted application.

A malicious process may be a process running from a malicious application.

A non-trusted process may be a process running from a non-trusted application.

A trusted process may be a process running from a trusted application.

Access to information being displayed to a user may include at least a call of a system function as a result of which the binary representation of the information being displayed to the user is loaded into the memory (e.g., RAM) of the computing device. An example of such a function is the WinAPI function BitBlt.

A danger rating of access to information being displayed to a user (in short, an access danger rating) may be a number (such as one from 0 to +∞; or from 0 to 1000, where if the rating is higher than 1000 when calculated, its value is taken as being 1000), which may be higher as the access to the information being displayed to the user is more characteristic of a malicious process.

Figure 1:
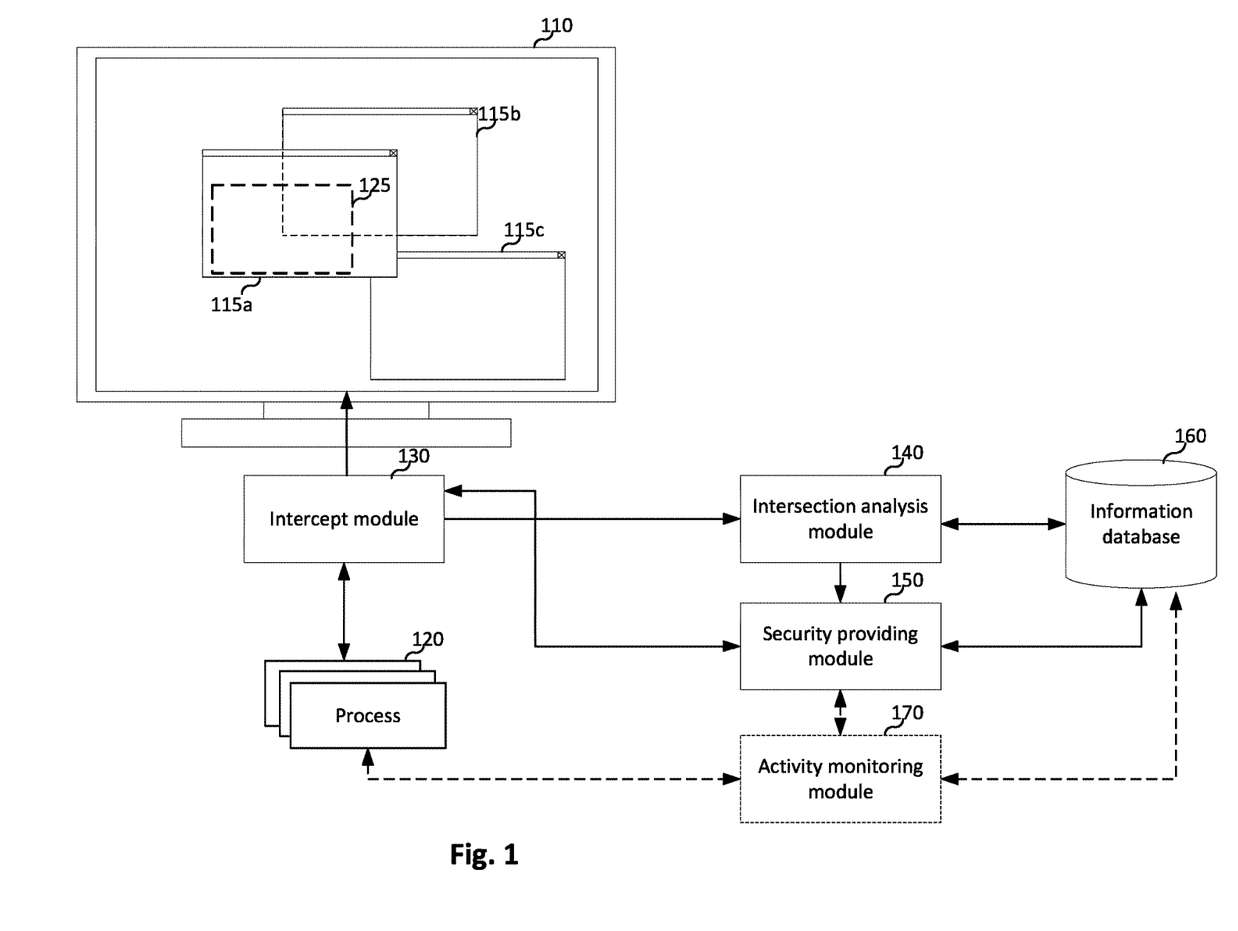
FIG. 1 illustrates a structural diagram of an exemplary system for blocking access to protected applications on a user's computing device.

FIG. 1 illustrates a structural diagram of an exemplary system for blocking access to protected applications on a user's computing device. The system includes the following components: an intercept module 130, an intersection analysis module 140, a security providing module 150. In one exemplary aspect, the system further includes an information database 160. Said system may reside on the user's computing device (for example, a PC, notebook, smart phone, or other computing device), which for simplicity shall be called a "computing device", and a detailed description of which will be provided further below.

In one exemplary aspect, the computing device contains a display 110 (in a exemplary aspect, said display 110 is not part of the computing device, but rather is connected to it along with other input/output devices). The display 110 may display information to the user of the computing device (hereinafter, the "user"), and the displayed information may include text, graphic images, and so on. The information may be displayed by various elements of a graphic interface (for example, the task panel in the Windows operating system) of the operating system (OS), and also via elements of a graphic interface 115 (115*a*, 115*b*, and 115*c*) of the processes 120 being executed on the computing device. In one exemplary aspect, such an element of the graphic interface may be a process window 120. In another aspect, the element of the graphic interface 115 can be a process widget 120. In yet another aspect, the element of the graphic interface 115 can be a pop-up window. In yet another aspect, the element of the graphic interface 115 can be an icon of the application from which the process 120 was launched, an icon of the process 120 in the notification panel (status bar for OS Android or tray for OS Windows). The processes 120 being executed on the computing device may be launched from applications which are present on at least the same computing device. In one exemplary aspect, said applications may be present on another computing device (for example, on a remote server or a network disk). In one exemplary aspect, the processes 120 being executed may include processes not having elements of the graphic interface 115.

In one exemplary aspect, the intercept module 130 may be configured to intercept access of the process to the information being displayed. The intercept module 130 may be configured to determine at least: (1) information about the process 120 implementing the access to the information being displayed to the user, said information including at least the identifier of the mentioned process 120 (e.g., the process identifier, PID); and (2) the region 125 on the display 110 of the computing device in which region information is being displayed to the user, and to which access is being implemented by the process 120.

The determination of the region 125 on the display 110 of a computing device may be at least a determination of the location of the region. In one exemplary aspect, the location of the region 125 on the display 110 of a computing device can be the vertex coordinates of the region 125 or the coordinates of one of the vertices (such as upper left) and the dimensions of the region 125—its height and width. The region 125 may have a rectangular shape. In yet another aspect, the region may have an arbitrary shape, the determination of such a shape may be based on determination of a function which describes the exact or approximate (e.g., with a specified accuracy) location of points on the border of the region. Access to the information being displayed to the user may be at least the calling of a function (such as a system function), as a result of which the binary representation (bitmap) of the information being displayed to the user may be loaded into the computing device memory. In one aspect, said memory can be the RAM of the computing device. An example of such a function may be the Windows API function BitBlt. In one exemplary aspect, such a function can be DrvCopyBits. In yet another exemplary aspect, such a function can be PrintWindow, StretchBlt or PlgBlt.

To carry out the intercepting, the intercept module 130 may be realized as a driver. In one exemplary aspect, this driver intercepts the call of the function BitBlt or PrintWindow. Upon intercepting this function call using the driver, it is possible to determine the context of the call: the process identifier (PID) and/or the thread identifier (TID). The data so obtained may be the aforementioned information about the process. The location of the region 125 may be determined by the corresponding parameters of the function called (and afterwards intercepted): nHeight, hdcSrc, nXSrc, nYSrc.

In the OS Windows version 8 and later, there is a component PatchGuard which protects the OS against changing of certain critical structures and tables of the operating system (such as the system call table, the global descriptor table, the interrupt descriptor table, and so forth). This component does not allow the aforementioned approach to the intercepting of access to be carried out on the driver level. In one exemplary aspect, the intercept module 130 can be realized in the form of a component of the DWM (Desktop Windows Manager) subsystem for displaying of elements of the graphic interface 115 of processes 120. Such a component may be embedded in the form of a dll-file, which may be loaded into the address space of the process dwm.exe. After the calling of the function BitBlt by a certain process 120, a chain of function calls may ensue (NtGdiBitBlt, DwmSyncCaptureScreenBits), as a result of which DWM may receive an LPC (local procedure call) request, which may be intercepted by the intercept module 130. Information about the process 120 implementing the access to the information being displayed to the user is found in the header of this request: the PID and TID. The data obtained in this way may be information about the aforementioned process. The location of the region 125 may be determined by the corresponding parameters of the function called via the LPC request (nHeight, hdcSrc, nXSrc, nYSrc).

In yet another exemplary aspect, the intercept module 130 may be realized in the form of a driver which intercepts access by applications to the display driver (such as the cdd.dll—Canonical Display Driver). In the given case, the intercept module 130 may intercept the call of the function to copy the surface DrvCopyBits. Upon intercepting this function call using the driver, the context of the call can be determined: the PID (Process Identifier) and TID (Thread Identifier). The data so obtained may be the aforementioned information on the process. Moreover, in the call of the function for accessing the surface, the intercept module 130 may determine the identifier of the surface being accessed. Using the surface identifier, the intercept module 130 may determine the region being accessed—the coordinates and dimensions. The location of the region 125 may be determined by the corresponding parameters of the function called (the parameter pptlSrc).

In yet another exemplary aspect, the determination of the location of the region 125 on the display 110 of the computing device may include the determination of the device context, which may correspond to the region 125, and within which the information displayed to the user may be being accessed (in other words, the device context indicated as a function call parameter). In one exemplary aspect, the device context may be a parameter of the call of the intercepted function hdcSrc (for example, for the functions BitBlt, PlgBlt and StretchBlt).

In yet another exemplary aspect, the determination of the location of the region 125 on the display 110 of the computing device may include determination of the surface corresponding to the region 125 being accessed via the intercepted function call. In one exemplary aspect, the surface (specifically, the pointer to the structure SURFOBJ) is the parameter psoSrc of the intercepted function call DrvCopyBits.

In yet another exemplary aspect, the determination of the location of the region 125 on the display 110 of the computing device includes determination of the identifier of the window (window handle) corresponding to the region 125 being accessed via the intercepted function call. In one exemplary aspect, the window identifier may be the parameter hwnd of the intercepted function call PrintWindow.

The information determined by the intercept module 130 as to the process 120 implementing the access to the information being displayed to the user, and also the region 125 on the display 110 of the computing device (in particular, information describing the region—the location of the region 125 on the display 110 of the computing device) where information is being displayed to the user, and which information is being accessed, may be relayed by the intercept module 130 to the intersection analysis module 140. The information determined by the intercept module 130 about the process 120 implementing the access to the information being displayed to the user is also relayed to the security providing module 150.

In one exemplary aspect, if the region 125 on the display 110 of the computing device, as determined by the intercept module 130, corresponds to the process 120 which is implementing the intercepted access, no further analysis is done in regard to such access, and the process 120 implementing the intercepted access continues its execution. In one exemplary aspect, the region 125 corresponds to the process 120 if the surface as determined by the intercept module 130 corresponds to the process 120. In yet another exemplary aspect, the region 125 corresponds to the process 120 if the window identifier as determined by the intercept module 130 corresponds to the window of the process 120. In another exemplary aspect, the region 125 corresponds to the process 120 if the device context as determined by the intercept module 130 corresponds to the process 120.

The intersection analysis module 140 may be configured to analyze the intersections of the region 125 determined using the intercept module 130 on the display 110 of the computing device with the regions of elements of the graphic interface 115 of processes 120 being executed on the computing device in order to determine which of the regions of the elements of the graphic interface 115 of the mentioned processes 120: contain the mentioned region 125; are contained in the mentioned region 125; and/or partly intersect with the mentioned region 125.

In one exemplary aspect, during the aforementioned analysis the intersection analysis module 140 compares the location of the regions of all elements of the graphic interface 115 of the processes 120 being executed on the computing device with the location of the region 125 determined by the intercept module 130. In one exemplary aspect, the location of the regions of the elements of the graphic interface 115 of the processes 120 is determined by the intersection analysis module 140 on the basis of data about the elements of the graphic interface 115 (specifically, their location and dimensions) of the processes 120 which may be provided by the operating system. In one exemplary aspect, such data may be provided by the OS in response to a call of the function GetWindowRect.

In yet another exemplary aspect, the location of the regions of the elements of the graphic interface 115 of the processes 120 may be determined by the intersection analysis module 140 on the basis of data about the surfaces and their locations. Such data is obtained by the intersection analysis module 140 by intercepting the function calls for creating the surfaces DrvEnableSurface, specifically the value being returned—the pointer to the structure SUR-FOBJ, indicating the location of the surface corresponding to the element of the graphic interface 115 of the process 120.

In another exemplary aspect, the intersection analysis module 140 determines which of the regions of the elements of the graphic interface 115 of the processes 120 contain the region 125, are contained in the region 125 or partly intersect with the region 125, if the device context as determined by the intercept module 130, within which context access is being implemented to the information being displayed to the user (or the surface being accessed), coincides with the device context of the desktop, or if the window identifier as determined by the intercept module 130, being the parameter of the intercepted function, is the desktop identifier.

FIG. 1 also shows an example of the location of the elements of the graphic interface 115 of processes 120 being executed on a computing device. By comparing the location of the region 125, and also the location of the regions of the elements of the graphic interface 115, the intersection analysis module 140 determines that the region of the element of the graphic interface 115a of the process 120 contains (entirely) within itself the region 125, the region of the element of the graphic interface 115b of the process 120 partly intersects with the region 125, and the region of the element of the graphic interface 115c of the process 120 does not intersect with the region 125. In one exemplary aspect, the decision as to how the region 125 is situated with respect to the region of the element of the graphic interface 115 may be made on the basis of the vertex coordinates of the region 125 and the region of the element of the graphic interface 115. In yet another exemplary aspect, the decision as to how the region 125 is situated with respect to the region of the element of the graphic interface 115 may be made on the basis of the coordinates of one vertex (such as upper left), and also the dimensions (height and width) of the region 125 and of the element of the graphic interface 115.

In yet another exemplary aspect, the intersection analysis module 140 may determine the intersection fraction—the ratio of the dimension of the region 125 to the dimension of the region of intersection of the region 125 and the region of the element of the graphic interface 115. For example, for the region of the element of the graphic interface 115a the intersection fraction will be equal to 1, for the region of the element of the graphic interface 115b—⅓, and for the region of the element of the graphic interface 115c this intersection fraction will be equal to 0 (no intersection).

In yet another exemplary aspect, the intersection analysis module 140 may determine the element of the graphic interface 115 of the process 120 as containing the region 125 if this element of the graphic interface 115 is a window, and the device context of this window (which can be determined using the function call WinAPI GetDC) corresponds to the device context previously determined using the intercept module 130 within which access is being implemented to the information being displayed to the user. In this case, the intersection fraction is equal to 1. For all other processes 120, it may be considered that their elements of the graphic interface 115 do not intersect with the region 125.

In yet another exemplary aspect, the intersection analysis module 140 determines the element of the graphic interface 115 of the process 120 as containing the region 125 if this element of the graphic interface 115 is a window, and the surface which corresponds to the region 125 being accessed via the intercepted function call is the surface of this window. In this case, the intersection fraction is equal to 1. For all other processes 120, it may be considered that their elements of the graphic interface 115 do not intersect with the region 125.

In yet another exemplary aspect, the intersection analysis module 140 may determine the element of the graphic interface 115 of the process 120 as containing the region 125 if this element of the graphic interface 115 is a window, and the identifier of this window (HWND) coincides with the identifier of the window which corresponds to the region 125 and was previously determined using the intercept module 130. In this case, the intersection fraction is equal to 1. For all other processes 120, it may be considered that their elements of the graphic interface 115 do not intersect with the region 125.

The intersection analysis module 140 may further calculate the importance rating as determined using the intercept module 130 for the region 125 on the display of the computing device 110 on the basis of which of the regions of the elements of the graphic interface 115 of the processes 120 being executed on the computing device contain the aforementioned region 125, which of the regions of the elements of the graphic interface 115 are contained in the aforementioned region 125, and/or which of the regions of the elements of the graphic interface 115 partly intersect with the aforementioned region 125. The importance rating of the region 125 may depend on whether the information which is being displayed to the user using processes 120 whose regions of the elements of the graphic interface 115 contain, partly intersect with the mentioned region 125, or are contained in the mentioned region 125, is confidential. The higher the importance rating of the region 125, the greater the likelihood that the mentioned information is confidential. In one exemplary aspect, to calculate the importance rating of the region 125 use is also made of the intersection fraction of the region 125 with the regions of the elements of the graphic interface 115 of the processes 120.

In one exemplary aspect, the confidentiality of the information which is being displayed to the user via the process 120 whose region of the elements of the graphic interface 115 contains, partly intersects with the region 125, or is contained in the mentioned region 125, may be determined using the information database 160, which is linked to the intersection analysis module 140. The information database 160 stores the coefficients of confidentiality of the elements of the graphic interface 115 of the processes 120, expressed as a number. The higher the coefficient of confidentiality of the element of the graphic interface 115 of the process 120, the greater the likelihood that the element of the graphic interface 115 of this process 120 may display confidential information to the user. It is assumed that the processes 120 of applications for remote working with banks, processes 120 launched in "secure mode" (so-called "sandbox"), processes 120 of applications for working with email, and also child processes of those processes (for example, the process winword.exe, in which an attachment in an email is opened) with high probability are displaying confidential information via their elements of the graphic interface 115 (such as via their windows).

In one exemplary aspect, the information which may be stored in the information database 160 may be formulated by a specialist in the field of computer security and written into the database 160 by the intersection analysis module 140, which may obtain this information from a remote security server or a system administrator.

In yet another aspect, an activity monitoring module 170 is additionally included in the system for detection of a malicious application. The activity monitoring module 170 may be configured to track the actions being performed by the processes 120, and also to calculate the coefficients of confidentiality corresponding to the elements of the graphic interface 115 of the processes 120 on the basis of the actions being performed by the processes 120. In one exemplary aspect, the coefficients of confidentiality calculated by the activity monitoring module 170 may be sent to the information database 160 (if the information database 160 is already storing the values of the coefficients of confidentiality, their values will be updated). In another exemplary aspect, the calculated confidentiality coefficients may be sent by the activity monitoring module 170 to the security providing module 150, which in turn uses these coefficients along with those which the security providing module 150 may obtain from the information database 160. The actions being carried out by the process 120 refer to the system calls or sets of system calls being carried out by the process 120. In yet another exemplary aspect, an action may include the sending/receiving of an electronic communication (such as an email, a voice message, or an instant messaging communication). To carry out the tracking, the activity monitoring module 170 may be or may include a driver or a set of drivers, using which a determination may be made of the system calls (e.g., via intercepting) which are being carried out by the processes 120—thereby implementing a tracking. Determination of a system call may include determination of the process 120 which is implementing this call, as well as the arguments of the call. In one exemplary aspect, by using drivers, the activity monitoring module 170 determines the function calls for the launching of the processes (such as LoadModule, CreateProcess, CreateProcessAsUser, ShellExecute, WinExec and so forth), as well as network interaction functions (such as connect, socket, bind, receive, send and so forth). It should be kept in mind that the possibilities for determination of network calls are not limited to the examples given for the use of drivers. In yet another aspect the activity monitoring module 170 may be or may include a plug-in for the application from which the process 120 is launched, and using the plug-in there may be a determination of information about the message which was sent or received by this process 120. In a exemplary aspect, such information may be the sender of the message, the recipient of the message, the subject of the message, the content of the message, the type of message—incoming or outgoing. In yet another aspect, using such a plug-in the activity monitoring module 170 determines the author of the document, such as the author of the document Microsoft Word, where the authorship may be indicated in the header of the document (of the document file) when the document is created or modified.

In one exemplary aspect, the activity monitoring module 170 may calculate the coefficients of confidentiality for the elements of the graphic interface 115 of the processes 120 using heuristic rules. The purpose of using heuristic rules is to establish high coefficients of confidentiality of the elements of the graphic interface 115 of those processes 120 with which confidential information, or any other information whose theft is undesirable, can be displayed to the user. In one exemplary aspect, an example of such heuristic rules may be:

establish the maximum value of the coefficient of confidentiality for the elements of the graphic interface 115 of those processes 120 which establish protected network connections (such as https);

establish the maximum value of the coefficient of confidentiality for the elements of the graphic interface 115 of those processes 120 which establish connections with remote servers from a list of protected remote servers;

establish the maximum value of the coefficient of confidentiality for the elements of the graphic interface 115 of those processes 120 which are launched from a list of protected applications;

establish the maximum value of the coefficient of confidentiality for the elements of the graphic interface 115 of those processes 120 which open documents created by authors from a list of protected authors;

establish the maximum value of the coefficient of confidentiality for the elements of the graphic interface 115 of those processes 120 which receive messages from addressors (or send messages to addresses) from a list of protected contacts.

The information database 160 saves the addresses (IP addresses) of the remote servers (such as banking or email servers) appearing on the list of protected remote servers. The list of protected applications may be a list of applications which may be stored in the database 160 (for example, applications for working with banks, applications for preventing leaking of information—DLP, Data Leak Prevention, and so on). The list of protected contacts may be a list of contacts (such as the names or email addresses of senders or recipients of messages) which may be stored in the database 160. The list of protected authors may be a list of authors (for example, the name of the user who created a document) which may be stored in the database 160.

In one exemplary aspect, the maximum value of the coefficient of confidentiality may be, in a exemplary aspect, $10^9$. In yet another aspect, the maximum value of the coefficient of confidentiality may be a number not less than a threshold value which is used by the security providing module 150 (about which more will be said below). In yet another aspect, the maximum value of this coefficient of confidentiality may be the maximum numerical value which can be stored in the information database.

It should be noted that the activity monitoring module 170 need not calculate for a process 120 the coefficients of confidentiality of all of the elements of the graphic interface 115 of the process 120. In the general case, the activity monitoring module 170 only calculates, for a process 120, the coefficients of confidentiality of those elements of the graphic interface 115 whose value needs to be established according to the heuristic rules being used by the activity monitoring module 170.

In yet another exemplary aspect, the desktop in the OS may also be an element of the graphic interface 115 (like the windows of the processes 120), corresponding (e.g., belonging) to the process explorer.exe, and accordingly the information database 160 may store the coefficient of confidentiality of the element of the graphic interface 115 (desktop). In one exemplary aspect, the value of this coefficient of confidentiality may be the maximum value of the coefficient of confidentiality.

In one exemplary aspect, the activity monitoring module 170 may calculate the coefficients of confidentiality of the elements of the graphic interface 115 for each process 120 launched on the computing device. In yet another exemplary aspect, the activity monitoring module 170 may calculate the coefficients of confidentiality of the elements of the graphic interface 115 of the processes 120 about which information is being stored in the information database 160, this information being, for example, the process identifier or the process designation (such as winword.exe).

In one exemplary aspect, the intersection analysis module 140 may calculate the importance rating of the region 125 by the following formula:

$$K=\Sigma_{i=1}^{n} k_i.$$

In yet another exemplary aspect, the intersection analysis module 140 may calculate the importance rating of the region 125 by the following formula:

$$K=\Sigma_{i=1}^{n} s_i {}^* k_i.$$

In yet another exemplary aspect, the intersection analysis module 140 may calculate the importance rating of the region 125 by the following formula:

$$K=\Sigma_{i=1}^{n} p_i {}^* k_i.$$

In yet another exemplary aspect, the intersection analysis module 140 may calculate the importance rating of the region 125 by the following formula:

$$K=\Sigma_{i=1}^{n} s_i {}^* k_i {}^* p_i.$$

In yet another exemplary aspect, the intersection analysis module 140 may calculate the importance rating of the region 125 by the following formula:

$$K=\Sigma_{i=1}^{n} (k_i {}^* p_i)^{\Sigma_i}.$$

The formulas indicated above make use of the following denotations:

K may be the importance rating of the region 125;

n may be the number of elements of the graphic interface 115 of the processes 120 which are being displayed on the display 110 of the computing device;

$p_i$ may be the coefficient of confidentiality of the i-th element of the graphic interface 115 (in one exemplary aspect, taking on the value 1 for the i-th element of the graphic interface if a corresponding coefficient is not indicated in the database 160 for this element of the graphic interface 115 of the process 120);

$k_i$ may be the intersection fraction of the region 125 with the region of the i-th element of the graphic interface 115;

$s_i$ may be a weighting factor, being equal for the i-th element of the graphic interface to:
1, if the region of the i-th element of the graphic interface 115 partly intersects the region 125;
S1, where S1>1 (such as 100), if the region of the i-th element of the graphic interface 115 contains the region 125;
S2, where S2>S1 (such as 200), if the region of the i-th element of the graphic interface 115 is contained in the region 125.

In one exemplary aspect, the coefficient of confidentiality $p_i$ of the i-th element of the graphic interface 115 of a certain process 120*a* may be equal to the maximum of the coefficients of confidentiality of the elements of the graphic interface 115 of the processes 120 which are parent processes in relation to the process 120*a*. In yet another exemplary aspect, the coefficient of confidentiality $p_i$ of the i-th element of the graphic interface 115 of the process 120*a* may be equal to the maximum of the coefficients of confidentiality of the i-th element of the graphic interface 115 of the process 120*a* and the coefficients of confidentiality of the elements of the graphic interface 115 of its N parent processes 120 (where N, for example, can be equal to 2, if the process 120*a* has 2 parent processes).

It should be understood that the above given formulas are merely examples, exemplary aspects, and that any other formula whereby the importance rating of the region 125 will be larger as the coefficients $p_i$, $k_i$, $s_i$ are higher can be used to calculate the importance rating of the region 125 by the intersection analysis module 140.

The intersection analysis module 140 relays the calculated importance rating of the region 125 to the security providing module 150.

The security providing module 150 is designed to calculate the access danger rating (e.g., as defined above) for the information being displayed to the user on the basis of the information which is provided by the intercept module 130 about the process 120 accessing the information being displayed to the user, in order to calculate a combination of the danger rating for access to the information being displayed to the user and the importance rating of the region, as well as to recognize as malicious the application from which the process 120 was launched, whose accessing of the information being displayed to the user of the computing device was intercepted by the intercept module 130 if the combination of the danger rating for access to the information being displayed to the user and the importance rating of the region exceeds the established threshold value.

In one exemplary aspect, the security providing module 150 may calculate the access danger rating 125 according to the following formula:

$$D=S*V*A.$$

In yet another exemplary aspect, the security providing module 150 may calculate the access danger rating 125 according to the following formula:

$$D=S+V+A.$$

In yet another exemplary aspect, the security providing module 150 may calculate the access danger rating 125 according to the following formula:

$$D=A^{S}*V.$$

The formulas given above make use of the following denotations:
D may be the danger rating of the access being carried out by the process 120 to the region 125 and intercepted by the intercept module 130;
S may be a coefficient which takes on the following values:
  1, if the process 120 carrying out the intercepted access is a trusted process;
  S1, where S1>1 (such as 5), if the process 120 carrying out the intercepted access is a non-trusted process (or the database 160 has no information that the process 120 is trusted);
V may be a coefficient taking on the following values:
  1, if the process 120 carrying out the intercepted access was launched from an application for which there are no known vulnerabilities (or the database 160 has no information about known vulnerabilities);
  V1, where V1>1, if the process 120 carrying out the intercepted access was launched from an application for which there are known vulnerabilities (where V1 can be a fixed number, such as 10, or a number depending on the number of known vulnerabilities, such as V1=2*U, where U is the number of known vulnerabilities);
A may be a coefficient taking on the following values:
  1, if the process 120 carrying out the intercepted access was launched from an application whose functionality includes the implementing of access to information being displayed to the user (or the database 160 has no information about the functionality of said application);
  A1, where A1>1 (such as 100), if the process 120 carrying out the intercepted access was launched from an application whose functionality does not include the implementing of access to information being displayed to the user.

It should be understood that the above given formulas are merely examples, exemplary aspects, and that any other formula whereby the access danger rating will be larger as the coefficients A, S and V are higher can be used by the security providing module 150 to calculate the danger rating of access to the information being displayed on the display 110 by the process 120. In one exemplary aspect, the value of the access danger rating D cannot be less than 1.

In one exemplary aspect, the information on whether the application from which the process 120 performing the intercepted access was launched is trusted or non-trusted may be stored in the information database 160 and provided to the security providing module 150.

In one exemplary aspect, the information on whether known vulnerabilities exist for the application from which the process 120 performing the intercepted access was launched and how many such vulnerabilities are known may be stored in the information database 160 and provided to the security providing module 150.

In one exemplary aspect, the information on whether the functionality of the application from which the process 120 performing the intercepted access was launched includes the accessing of the information being displayed to the user may be stored in the information database 160 and provided to the security providing module 150. The functionality of an application may include the set of functions whose calls are characteristic of the process launched from the application. Accordingly, the information database 160 in one exemplary aspect may assign, to the application from which the process 120 was launched, a list of functions characteristic for the mentioned application—the functionality of the application.

As noted above, in one exemplary aspect the information which is stored in the information database 160 may be formulated by a specialist in computer security. In one exemplary aspect, this specialist himself may transfer (e.g., write) this information into the information database 160. In another exemplary aspect, this information may be written into the information database 160 by the intersection analysis module 140, which obtains this information from a remote security server or a system administrator.

It should be noted that the information database 160, in one exemplary aspect, may be or may include a group of databases, each of which may be designed to store data of one or more types—for example, coefficients of confidentiality $p_i$, weighting factors $s_i$, which are used in the above-described formulas, and so on.

After calculating the access danger rating, the security providing module 150 may make a decision whether or not to recognize as malicious the application from which the process 120 performing the access intercepted by the intercept module 130 was launched. This decision may be made by the security providing module 150 on the basis of a comparison of the combination of the access danger rating and the importance rating of the region 125 with a previously established threshold value: if the combination of the danger rating of access to the information being displayed to the user and the importance rating of the region 125 is greater than the established threshold value (for example, 1000), then the application from which the process 120 whose accessing of the information being displayed to the user was intercepted by the intercept module 130 was launched may be recognized as malicious. Otherwise, the mentioned application may not be recognized as malicious by the security providing module 150. As the combination in this case one can use the sum, the multiplication, or any other combination which is higher as the importance rating of the region 125 and the access danger rating are higher.

In yet another exemplary aspect, the security providing module 150 can send a command to the intercept module 130 to block access to the information being displayed to the user. The intercept module 130 may interrupt the call of the corresponding function (for example, by transfer of control to an instruction whose address is the return address of the function which was called) which may be carrying out the mentioned access. In yet another exemplary aspect, the blocking of access may be done by the intercept module 130 by substituting, in the memory of the computing device, the binary representation of the information being displayed to the user, which binary representation was loaded into memory via calling of the function used to carry out said access. In one exemplary aspect, the security providing module 150 may send a command to block access to the information if the combination of the danger rating of access to the information being displayed to the user and the importance rating of the region 125 is greater than an established threshold value (the algorithm for calculating this combination has been given above).

In one exemplary aspect, the security providing module 150, after recognizing a certain application as malicious in accordance with the above described scheme, may additionally send a command to the intercept module 130 to block access to the information being displayed to the user, which access is being carried out by the process 120 launched from the application recognized as being malicious.

In one exemplary aspect, the security providing module 150 may make a decision to recognize an application as malicious or to block access to the information being displayed solely on the basis of the importance rating of the region 125: if the importance rating of the region 125 is greater than an established threshold value, the application from which the process 120 carrying out the access to the information being displayed to the user was launched may be recognized as being malicious. Otherwise, said application is not recognized as malicious.

Figure 2:
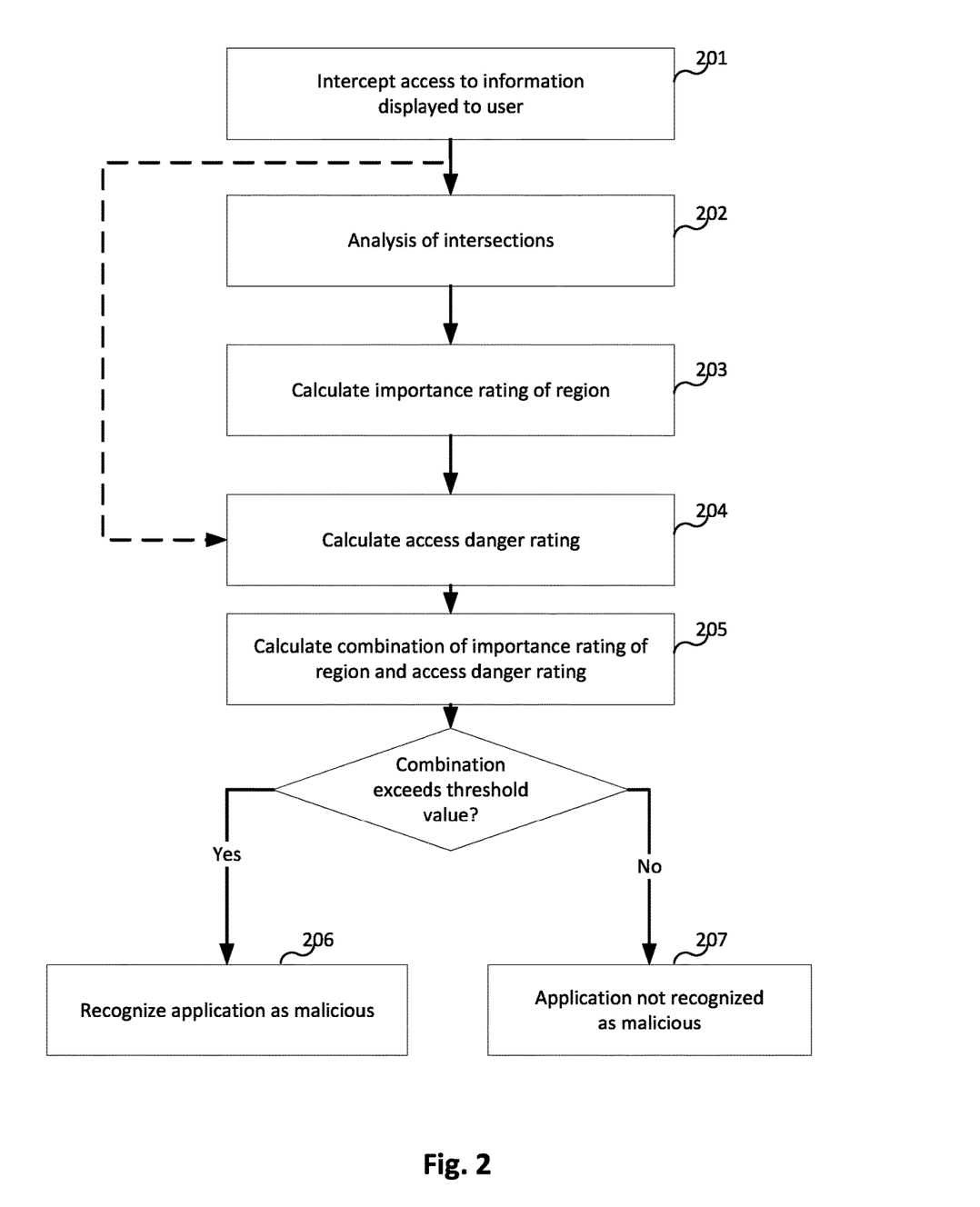
FIG. 2 shows a flow diagram of an exemplary method for blocking access to protected applications on a user's computing device.

FIG. 2 shows a flow diagram of an exemplary method for blocking access to protected applications on a user's computing device. In step 201, the intercept module 130 intercepts the access of the process 120 to the information being displayed to the user in order to determine at least: information about the process 120 carrying out the access to the information being displayed to the user, and/or the region on the display 110 of the computing device where the information is being displayed to the user, and which is being accessed. The information so obtained about the process may be sent by the intercept module 130 to the security providing module 150 and/or the intersection analysis module 140, and the region 125 so determined may be sent to the intersection analysis module 140. In step 202 the intersection analysis module 140 may analyze the intersection of the region 125 determined by the intercept module 130 with the region(s) of the elements of the graphic interface 115 of the processes 120 being executed on the computing device in order to determine which of the regions of the elements of the graphic interface 115 of the mentioned processes: contain the mentioned region, are contained in the mentioned region, an/or partly intersect with the mentioned region. The information on the intersection(s) may be used by the intersection analysis module 140 in step 203 to calculate the importance rating of the region 125. The calculated importance rating of the region 125 may be sent by the intersection analysis module 140 to the security providing module 150. The security providing module 150, in step 204, may calculate the danger rating of the access to the information being displayed to the user on the basis of the data obtained from the intercept module 130—information about the process carrying out the access which was intercepted by the intercept module 130. In step 205, the security providing module 150 may calculate the combination of the importance rating of the region 125 and the access danger rating. Then, if the combination obtained in step 205 is larger than a threshold value, in step 206 the security providing module 150 may recognize as malicious the application from which the process 120 was launched whose access to the information being displayed to the user of the computing device was intercepted in step 201. However, if the obtained combination does not exceed the threshold value, then, in step 207, the security providing module 150 does not recognize the mentioned application as being malicious.

It should be noted that step 204 may not depend on carrying out steps 202 and 203, and therefore step 204 may be performed in parallel with the performance of these steps or prior to these steps.

In yet another aspect, the system for detection of a malicious application further includes an activity monitoring module 170, which calculates the coefficients of confidentiality of the elements of the graphic interface 115 of the processes 120, for example, based on one or more heuristic rules (this step is not indicated in FIG. 2 and may not depend on the performance of steps 201 and 202, and therefore may be performed in parallel with the performance of these steps or prior to these steps).

Figure 3:
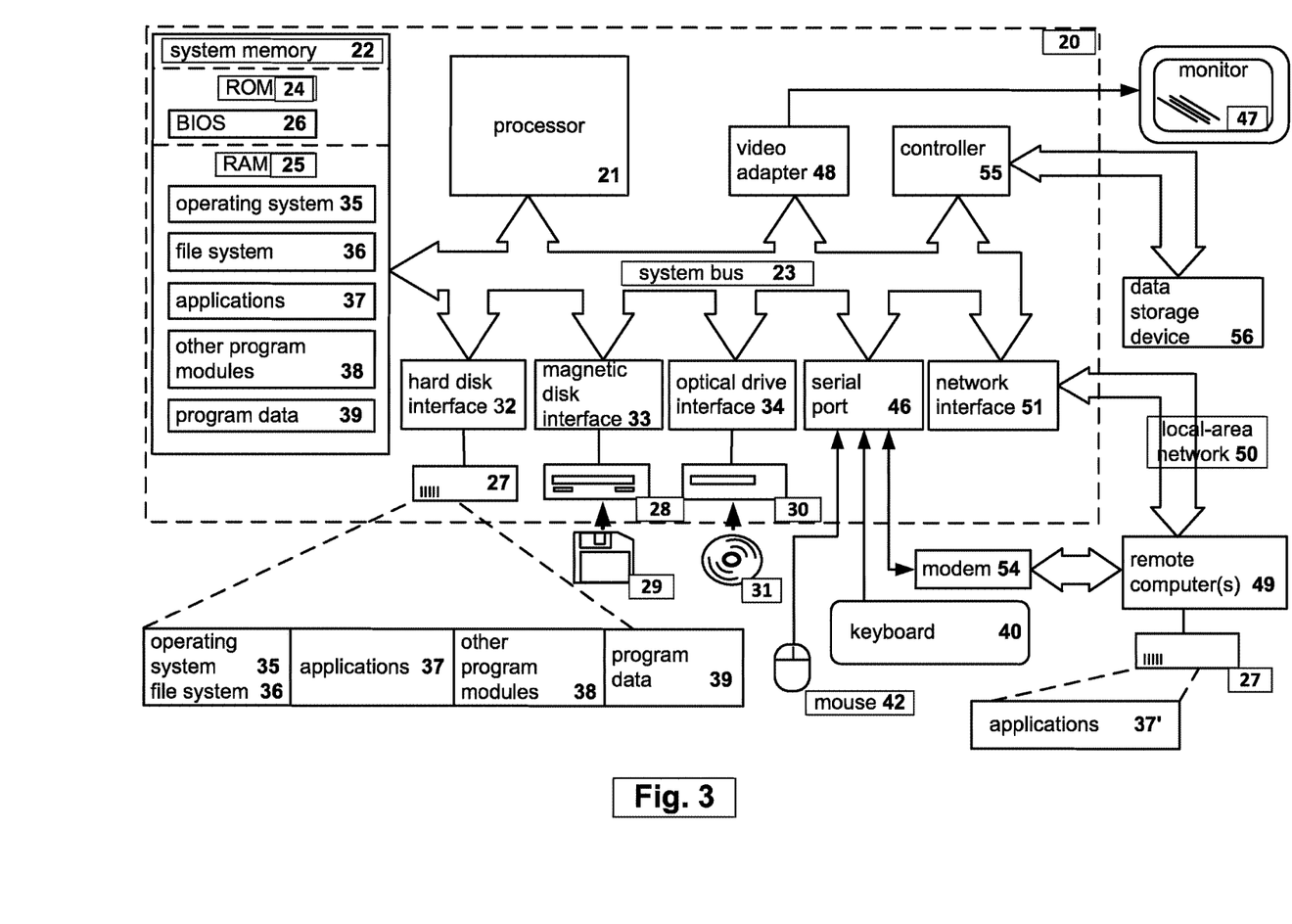
FIG. 3 shows an example of a general-purpose computer system on which the aspects of the systems and methods of blocking access to protected applications can be implemented.

FIG. 3 is a diagram illustrating a general-purpose computer system on which aspects of systems and methods of blocking access to protected applications may be implemented in accordance with an exemplary aspect. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transforms the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 3, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access of applications on a user's computing device, the method comprising:
    intercepting an access by a process to first information, the first information being information that is to be displayed on the user's device;
    determining second information based on the interception of the access by the process, the second information being information associated with the process;
    determining a region on a display of the user's device associated with the first information;
    analyzing one or more intersections between the region and at least one graphic interface associated with the process; and
    blocking the access by the process to the first information based on the analysis of the one or more intersections between the region and the at least one graphic interface associated with the process.

2. The method of claim 1, wherein the determination of the region comprises at least one of:
    determining a location on the display corresponding to the region;
    determining a device context that corresponds to the region;
    determining a surface corresponding to the region; or
    determining a window identifier corresponding to the region.

3. The method of claim 1, wherein the second information includes at least one of a process identifier or a thread identifier.

4. The method of claim 1, wherein the analysis of the one or more intersections between the region and the at least one graphic interface associated with the process comprises:
determining whether the at least one graphic interface associated with the process contains, is contained, or at least partially intersects the region on the display.

5. The method of claim 1, wherein the analysis of the one or more intersections between the region and the at least one graphic interface associated with the process comprises:
calculating an importance rating of the region based on the determination of whether the graphic interface associated with the process contains, is contained, or at least partially intersects the region on the display; and
calculating a danger rating based on the information about the process.

6. The method of claim 5, wherein the determination of whether to block the access by the process to the first information based on the analysis of the one or more intersections between the region and the at least one graphic interface associated with the process comprises:
combining the importance rating and the danger rating; and
comparing the combination of the importance rating and the danger rating to a predetermined threshold.

7. The method of claim 5, wherein the calculation of the importance rating of the region based on the determination of whether the graphic interface associated with the process contains, is contained, or at least partially intersects the region on the display comprises:
accessing, from an information database, one or more coefficients of confidentiality associated with one or more elements that at least partially intersect the region; and
calculating the importance rating based on an algorithm that takes into account the one or more coefficients of confidentiality.

8. The method of claim 7, further comprising:
calculating the one or more coefficients of confidentiality; and
storing the calculated one or more coefficients of confidentiality in the information database.

9. The method of claim 1, wherein the blocking of the access by the process to the first information comprises:
substituting, in a memory of the computing device, a binary representation of the information being displayed to the user.

10. The method of claim 1, further comprising:
determining whether an application associated with the process is malicious based on the analysis of the one or more intersections between the region and the at least one graphic interface associated with the process.

11. A system for controlling access of applications on a user's computing device, the system comprising:
at least one processor configured to:
intercept an access by a process to first information, the first information being information that is to be displayed on the user's device;
determine second information based on the interception of the access by the process, the second information being information associated with the process;
determine a region on a display of the user's device associated with the first information;
analyze one or more intersections between the region and at least one graphic interface associated with the process; and
block the access by the process to the first information based on the analysis of the one or more intersections between the region and the at least one graphic interface associated with the process.

12. The system of claim 11, wherein the at least one processor is configured to determine the region by at least one of:
determining a location on the display corresponding to the region;
determining a device context that corresponds to the region;
determining of a surface corresponding to the region; or
determining of a window identifier corresponding to the region.

13. The system of claim 11, wherein the second information includes at least one of a process identifier or a thread identifier.

14. The system of claim 11, wherein the at least one processor is configured to analyze the one or more intersections between the region and the at least one graphic interface associated with the process by:
determining whether the at least one graphic interface associated with the process contains, is contained, or at least partially intersects the region on the display.

15. The system of claim 11, wherein the at least one processor is configured to analyze the one or more intersections between the region and the at least one graphic interface associated with the process by:
calculating an importance rating of the region based on the determination of whether the graphic interface associated with the process contains, is contained, or at least partially intersects the region on the display; and
calculating a danger rating based on the information about the process.

16. The system of claim 15, wherein the at least one processor is configured to determine whether to block the access by the process to the first information is based on the analysis of the one or more intersections between the region and the at least one graphic interface associated with the process by:
combining the importance rating and the danger rating; and
comparing the combination of the importance rating and the danger rating to a predetermined threshold.

17. The system of claim 15, wherein the at least one processor is configured to calculate the importance rating of the region based on the determination of whether the graphic interface associated with the process contains, is contained, or at least partially intersects the region on the display by:
accessing, from an information database, one or more coefficients of confidentiality associated with one or more elements that at least partially intersect the region; and
calculating the importance rating based on an algorithm that takes into account the one or more coefficients of confidentiality.

18. The system of claim 17, wherein the at least one processor is further configured to:
calculate the one or more coefficients of confidentiality; and
store the calculated one or more coefficients of confidentiality in the information database.

19. The system of claim 11, wherein the at least one processor is configured to block the access by the process to the first information by:
substituting, in a memory of the computing device, a binary representation of the information being displayed to the user.

20. A non-transitory computer-readable medium storing computer executable instructions for controlling access of applications on a user's device, comprising instructions for:

intercepting access by a process of first information to be displayed on the user's device;

determining second information based on the interception of the access by the process, the second information associated with the process;

determining a region on a display of the user's device associated with the first information;

analyzing one or more intersections between the region and at least one graphic interface associated with the process; and blocking the access by the process to the first information based on the analysis of the one or more intersections between the region and the at least one graphic interface associated with the process.

* * * * *